United States Patent
Liu

(10) Patent No.: US 12,004,103 B2
(45) Date of Patent: Jun. 4, 2024

(54) METHOD AND APPARATUS FOR TRANSMITTING SYNCHRONIZED BROADCAST TRANSMISSION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/167,549

(22) Filed: Feb. 10, 2023

(65) Prior Publication Data

US 2023/0189174 A1   Jun. 15, 2023

Related U.S. Application Data

(63) Continuation of application No. 17/034,978, filed on Sep. 28, 2020, now Pat. No. 11,617,142, which is a
(Continued)

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04L 5/10* (2013.01); *H04W 16/28* (2013.01); *H04W 72/30* (2023.01)

(58) Field of Classification Search
CPC . H04W 56/001; H04W 16/28; H04W 72/005; H04W 48/12; H04W 48/10;
(Continued)

(56) References Cited

U.S. PATENT DOCUMENTS

| 2017/0094528 A1 | 3/2017 | Takeda et al. |
| 2017/0094624 A1 | 3/2017 | Balachandran et al. |
| 2021/0007072 A1 | 1/2021 | Wu |

FOREIGN PATENT DOCUMENTS

| CN | 1606259 A | 4/2005 |
| CN | 101521851 A | 9/2009 |

(Continued)

OTHER PUBLICATIONS

International Search Report issued Dec. 28, 2018 in International Application No. PCT/CN2018/081524, (with English translation) (6 pages).
(Continued)

*Primary Examiner* — Eric Myers
(74) *Attorney, Agent, or Firm* — Oblon, McClelland, Maier & Neustadt, L.L.P.

(57) ABSTRACT

Aspects of the disclosure provide a method and apparatus for transmitting a synchronization broadcast transmission. At least one candidate transmission location corresponding to at least one synchronization signal/physical broadcast channel block (SSB) to be transmitted, is determined, where a number of the at least one candidate transmission location is greater than a number of SSBs in one time interval. Further, synchronization broadcast transmission including the at least one SSB is generated, and the generated synchronization broadcast transmission is transmitted at the at least one candidate transmission location in a beam sweeping manner.

12 Claims, 16 Drawing Sheets

Related U.S. Application Data continuation of application No. PCT/CN2018/081524, filed on Apr. 2, 2018.

(51) Int. Cl.
*H04L 5/10* (2006.01)
*H04W 16/28* (2009.01)
*H04W 72/30* (2023.01)

(58) Field of Classification Search
CPC .......... H04W 72/0446; H04W 72/046; H04W 72/085; H04W 56/00; H04L 5/0051; H04L 5/10; H04L 5/0048; H04L 5/0023; H04L 5/0044; H04B 7/0695; H04B 7/00; H04J 11/0069
See application file for complete search history.

(56) References Cited

FOREIGN PATENT DOCUMENTS

| | | | |
|---|---|---|---|
| CN | 102201905 A | 9/2011 | |
| CN | 103843382 A | 6/2014 | |
| CN | 106453182 | 2/2017 | |
| CN | 106465172 | 2/2017 | |
| CN | 106793058 | 5/2017 | |
| CN | 106850162 A | 6/2017 | |
| CN | 107278383 A | 10/2017 | |
| CN | 107466446 A | 12/2017 | |
| CN | 107528682 | 12/2017 | |
| JP | 2021-503205 A | 2/2021 | |
| JP | 2021-517416 A | 7/2021 | |
| RU | 2 533 664 C2 | 11/2014 | |
| WO | WO 2014/123378 A1 | 8/2014 | |
| WO | WO 2015/174438 A1 | 11/2015 | |
| WO | WO 2016203290 | 12/2016 | |
| WO | WO 2017/025000 A1 | 2/2017 | |
| WO | WO 2019/095255 A1 | 5/2019 | |
| WO | WO 2019/183905 A1 | 10/2019 | |

OTHER PUBLICATIONS

Written Opinion of the International Searching Authority issued Dec. 28, 2018 in International Application No. PCT/CN2018/081524. (3 pages).
Combined Chinese Office Action and Search Report issued on Jul. 3, 2020, in Patent Application No. 201880000501.6 (with English translation), 12 pages.
"Status Report to TSG" NTT Docomo. Inc., 3GPP TSG RAN Meeting #76" RP-171137 Jun. 8, 2017, p. 5, lines 28 and 29, and p. 31, last line top. 32, line 7, 218 pages.
Combined Chinese Office Action and Search Report issued Nov. 5, 2020, in Chinese Patent Application No. 201880000501.6 (with English translation), 6 pages.
"Discussion on SS Periodicity" LG Electronics, 3GPP TSG RAN WG1 Meeting #88bis, R1-1704864, Spokane, USA, Apr. 3-7, 2017, 3 pages.
"Discussion on UE Behavior During Measurement Outside Measurement Gap" Huawei, HiSilicon, 3GPP TSG-RAN WG4 Meeting NR #86, R4-1802620, Athens, Greece, Feb. 26-Mar. 3, 2018, 6 pages.
"DMRS Sequence Design for NR-PBCH" ITL, 3GPP TSG RAN WG1 Meeting #90, R1- 1714407, Prague, P.R. Czechia, Aug. 21-25, 2017, 6 pages.
"Discussion on SS Frequency Raster" LG Electronics, 3GPP TSG RAN WG1 Meeting #88, R1-1702435, Athens, Greece, Feb. 13-17, 2017, 4 pages.
Korean Office Action issued Aug. 3, 2021 in Korean Patent Application No. 10-2020-7029754, 19 pages.
ZTE, R1-1709886, "Timing indication based on SS blocks", 3GPP TSG RAN WG1#AH,3GPP server publication date(Jun. 27-30, 2017), 7 pages.
InterDigital Inc., R1-1708326,"On SS Block Time Index Indication in NR",3GPP TSG RAN WG1#89,3GPP server publication date(May 15-19, 2017), 4 pages.
Russian Office Action issued Apr. 12, 2021 in Russian Patent Application No. 2020135501 (with English translation), 12 pages.
Extended European Search Report issued Mar. 10, 2021in European Patent Application No. 18913219.4, 11 pages.
CATT: "Transmitted SS-block Indication", 3GPP Draft; R1-1712349 Transmitted SS-Blcok Indication, 3rd Generation Partnership Project (3GPP), Mobile Competence Centre; 650, Route Des Lucioles; F-06921 Sophia-Antipolis Cedex; France vol. RAN WG1, No. Prague, Czechia; Aug. 21, 2017-Aug. 25, 2017, XP051315165, section 2., 3 pages.
NTT Docomo et al: "Remaining details on Remaining minimum system information delivery", 3GPP Draft: R1-1720791 Remaining Details on Remaining Minimum System Information Delivery RMSI Final, 3rd Generation Partnership Project (3GPP), Mobile Competence Centre; 650, Route Des Lucioles; F-vol. RAN WG1, No. Reno, USA; Nov. 27, 2017-Dec. 1, 2017, XP051370220, see sections 2.1 & 2.5. 10 pages.
Nokia et al: "On SS Burst Set composition", 3GPP Draft; R1-1711261, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; May 15, 2017-May 19, 2017, XP051304430, section 2., 11 pages.
Second Japanese Office Action issued Feb. 9, 2022 in Japanese Patent Application No. 2020-552860 (with English translation), 8 pages.
"Remaining Details of RRM Measurements" ZTE, Sanechips, 3GPP TSG RAN WG1 Meeting #90bis R1-1717037, Prague, Czech Republic, Oct. 9-13, 2017, 10 pages.
Japanese Office Action issued Nov. 8, 2021 in Japanese Patent Application No. 2020-552860 (with English translation), 7 pages.
Guangdong OPPO Mobile Telecom, "Discussion on design of SS block," 3GPP TSG RAN WG1 Meeting #90 R1-1713240, Aug. 2017, 2 pages.

METHOD AND APPARATUS FOR TRANSMITTING SYNCHRONIZED BROADCAST TRANSMISSION

CROSS REFERENCE TO RELATED APPLICATION

This application is a continuation application of U.S. patent application Ser. No. 17/034,978 filed on Sep. 28, 2020, which is a continuation application of International application No. PCT/CN2018/081524, filed on Apr. 2, 2018 and entitled "METHOD AND APPARATUS FOR TRANSMITTING SYNCHRONIZED BROADCAST INFORMATION", the disclosure of which are hereby incorporated by reference in their entirety.

TECHNICAL FIELD

The present disclosure relates to the technical field of communication, including to a method and device for transmitting a synchronization broadcast transmission.

BACKGROUND

In the related art, a project in the industry has recently been set up for research on 5th-Generation unlicensed spectrums, and a solution supporting independent networking of 5G unlicensed cells has been proposed. For design of independent networking of 5G unlicensed spectrums, the first step is considering design of synchronization signal (SS)/physical broadcast channel (PBCH) blocks (SSBs). However, there currently is no effective solution in the industry at present.

SUMMARY

According to a first aspect of the present disclosure, a method for transmitting a synchronization broadcast transmission is provided. The method can include determining at least one candidate transmission location corresponding to at least one synchronization signal/physical broadcast channel block (SSB) to be transmitted, wherein a number of the at least one candidate transmission location is greater than a number of SSBs in one time interval. The method can further include generating the synchronization broadcast transmission comprising the at least one SSB, and transmitting the generated synchronization broadcast transmission at the at least one candidate transmission location in a beam sweeping manner.

According to a second aspect of the present disclosure, a method for transmitting a synchronization broadcast transmission is provided. The method can include receiving the synchronization broadcast transmission from a base station, and parsing a synchronization signal/physical broadcast channel block (SSB) according to the synchronization broadcast transmission, for acquiring an SSB identifier. The parsing the SSB for acquiring the SSB identifier can include deriving the SSB identifier according to a correspondence relationship between a number of at least one candidate transmission locations and a number of SSBs in one time interval, wherein one of the at least one candidate transmission location is corresponding to the SSB, and the number of the at least one candidate transmission location is greater than the number of SSBs in the one time interval.

According to a third aspect of the present disclosure, a device for transmitting a synchronization broadcast transmission is provided. The device can include a processor and a memory configured to store instructions executable by the processor. The processor may be configured to determine at least one candidate transmission location corresponding to at least one SSB to be transmitted, wherein a number of the at least one candidate transmission location is greater than a number of SSBs in one time interval. The processor can be further configured to generate the synchronization broadcast transmission including the at least one SSB, and transmit the generated synchronization broadcast transmission at the at least one candidate transmission location in a beam sweeping manner.

According to a fourth aspect of the present disclosure, a device for transmitting a synchronization broadcast transmission is provided. The device can include a processor, and a memory configured to store instructions executable by the processor. The processor may be configured to receive synchronization broadcast transmission from a base station, and parse an SSB according to the synchronization broadcast transmission, for acquiring an SSB identifier. In parsing the SSB for acquiring the SSB identifier, the processor can be configured to derive the SSB identifier according to a correspondence relationship between a number of at least one candidate transmission locations and a number of SSBs in one time interval, wherein one of the at least one candidate transmission location is corresponding to the SSB, and the number of the at least one candidate transmission location is greater than the number of SSBs in the one time interval.

According to a fifth aspect of the present disclosure, a non-transitory computer-readable storage medium is provided, in which a computer instruction may be stored, the instructions being executed by a processor to implement the method applied to a base station side.

According to a sixth aspect of the present disclosure, a non-transitory computer-readable storage medium is provided, in which a computer instruction may be stored, the instructions being executed by a processor to implement the method applied to a UE side.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure, and serve to explain the principles of the present disclosure together with the description.

DETAILED DESCRIPTION

Figure 1:
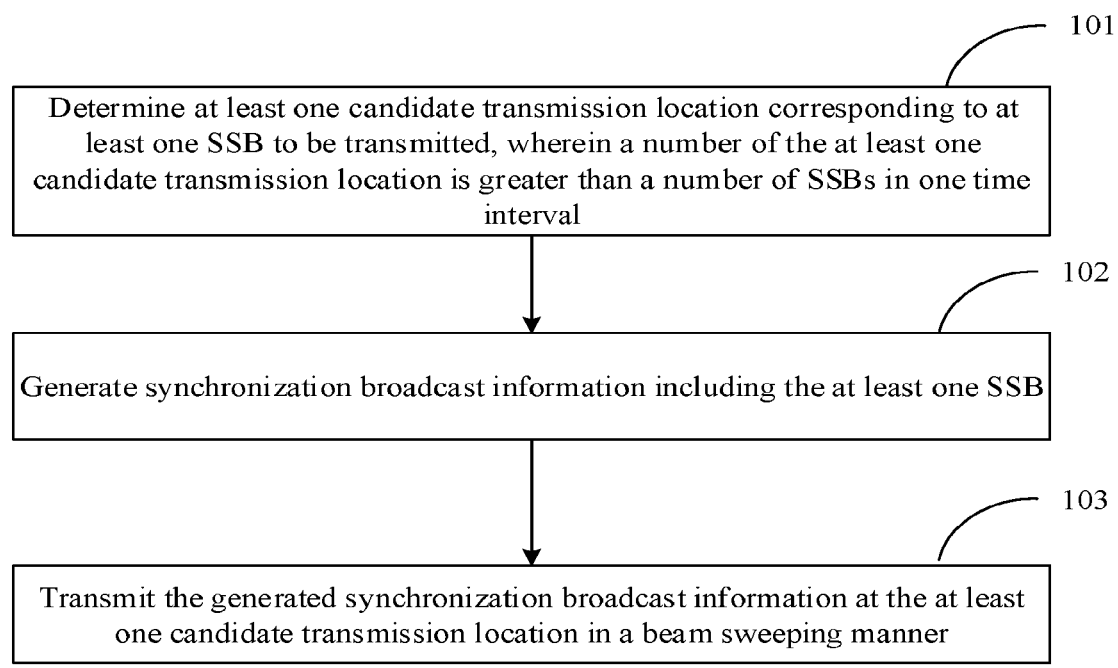
FIG. 1 is a flow chart showing a method for transmitting a synchronization broadcast transmission according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the related art, it is proposed in the industry that independent networking of unlicensed frequency bands should be implemented, namely all functions such as initial access and the like should be realized by a cell of an unlicensed frequency band independently of a New Radio (NR) cell. An SSB should be firstly transmitted in the cell of the unlicensed frequency band, but there is yet no effective solution in the industry. A possible solution is continuing to use the SSB design solution for the NR cell, which requires to follow a Listen Before Talk (LBT) principle for the unlicensed frequency band, namely energy has to be detected before signal transmission, and wait is necessary if the detected channel is being used by others for transmission. On the premise of following the LBT principle, directly following the SSB design solution for the NR cell may bring the problem of search delay of UE. For example, in the unlicensed frequency band, if the UE starts searching for SSBs at a transmitting opportunity of an SSB1 while a base station detects that the channel is occupied at a transmitting moment of the SSB1, the base station may miss the transmitting opportunity of the SSB1, and the UE has to wait to search for an SSB2. If the above situation also occurs when the SSB2 and an SSB3 are transmitted, the UE may not find any SSB in this time interval, resulting in the search delay of the UE. In addition, due to the transmitting characteristic of beam sweeping in 5G, even if the channel were not occupied at transmitting moments of the SSB2 and the SSB3, once the beam does not aim at the UE, the UE may not receive the transmitted beam, and thus cannot find the SSB2 and the SSB3, resulting in the search delay of the UE.

More candidate transmission locations can be provided in the embodiments, and the number of the candidate transmission locations is greater than the number of SSBs in one time interval. Even if a certain candidate transmission location is occupied by another resource, a base station may transmit synchronization broadcast transmission at other candidate transmission locations. Therefore, there are more opportunities for the base station to transmit the synchronization broadcast transmission, which is favorable for timely synchronization processing of UE.

Embodiments of the present disclosure can provide a method and device for transmitting a synchronization broadcast transmission. The technical solutions are implemented as follows.

According to a first aspect of the present disclosure, a method for transmitting a synchronization broadcast transmission is provided. The method can include determining at least one candidate transmission location corresponding to at least one synchronization signal/physical broadcast channel block (SSB) to be transmitted, wherein a number of the at least one candidate transmission location is greater than a number of SSBs in one time interval. The method can further include generating the synchronization broadcast transmission comprising the at least one SSB, and transmitting the generated synchronization broadcast transmission at the at least one candidate transmission location in a beam sweeping manner.

The technical solution provided in the embodiments of the present disclosure may have the following beneficial effects. In the embodiments, the number of at least one candidate transmission location is greater than the number of SSBs in one time interval. A system prepares more candidate transmission locations, and if a channel is occupied at a transmitting moment for a certain candidate transmission location, there are more other candidate transmission locations for selection, so that the probability that a base station transmits the synchronization broadcast transmission is improved, and convenience is brought to timely synchronization processing of User Equipment (UE). In an embodiment, the number of the at least one candidate transmission location may be n times the number of SSBs in one time interval, n is equal to 2 or n is a ratio of a duration of a time interval to a duration of a half frame.

The technical solution provided in the embodiment of the present disclosure may have the following beneficial effects. In the embodiment, the number of the at least one candidate transmission location is at least twice the number of SSBs in one time interval, so that relatively more candidate transmission locations are provided, the probability that the base station transmits the synchronization broadcast transmission is improved, and convenience is brought to timely synchronization processing of the UE.

In an embodiment, the synchronization broadcast transmission further includes at least one SSB identifier of the at least one SSB; the at least one SSB identifier is carried in the at least one SSB. A maximum value of the at least one SSB identifier corresponds to the number of SSBs in the time interval, or the maximum value of the at least one SSB identifier corresponds to the number of the at least one candidate transmission location.

The technical solution provided in the embodiment of the present disclosure may have the following beneficial effects. In the embodiment, multiple numbering manners for the SSB identifier are provided and may be adopted flexibly, and convenience is brought to recognition and synchronization processing of the UE. In an embodiment, the at least one SSB identifier may be transmitted through a demodulation reference signal (DMRS) sequence of a PBCH in the SSB and data bits in the PBCH.

The technical solution provided in the embodiment of the present disclosure may have the following beneficial effect. In the embodiment, an implementation solution for a transmission location of the SSB identifier is provided.

In an embodiment, the operation of transmitting the generated synchronization broadcast transmission at the at least one candidate transmission location in the beam sweeping manner may include transmitting the generated synchronization broadcast transmission at the at least one candidate transmission location in a selected candidate transmitting slot in the beam sweeping manner. A candidate set of the candidate transmitting slot being {10, 20, 40, 80, 160}ms, or the candidate set of the candidate transmitting slot being {5, 10, 20, 40, 80, 160}ms in response to that the number of SSBs in one time interval is 4, or the candidate set of the candidate transmitting slot being {10, 20, 40, 80, 160}ms in response to that the number of SSBs in one time interval is greater than 4.

The technical solution provided in the embodiment of the present disclosure may have the following beneficial effects. In the embodiment, relatively more candidate transmission locations are provided, so that the candidate transmitting slots are changed accordingly. In the embodiment, an implementation solution for the candidate transmitting slot is provided.

In an embodiment, at least two SSBs to be transmitted may belong to a group. Additionally, the method may further include detecting whether the at least one candidate transmission location is idle or not, in response to that the at least one candidate transmission location is not idle, determining all SSBs in a group to which the at least one SSB to be transmitted belongs, and waiving transmission of the generated synchronization broadcast transmission at the at least one candidate transmission location corresponding to all the SSBs in the group in the beam sweeping manner.

The technical solution provided in the embodiment of the present disclosure may have the following beneficial effects. In the embodiment, multiple SSBs to be transmitted may be classified into a group, so that the base station may manage multiple SSBs in batches and control transmission and waiving transmission of the multiple SSBs.

According to a second aspect of the embodiments of the present disclosure, a method for transmitting a synchronization broadcast transmission is provided. The method may include receiving the synchronization broadcast transmission from a base station, parsing a synchronization signal/physical broadcast channel block (SSB) according to the synchronization broadcast transmission, for acquiring an SSB identifier, and determining a subframe number corresponding to the acquired SSB identifier according to a preset correspondence relationship between SSB identifiers and subframe numbers.

The technical solution provided in the embodiment of the present disclosure may have the following beneficial effects. In the embodiment, UE may parse the SSB identifier and determine the corresponding subframe number, and implement synchronization with a network side.

In an embodiment, a maximum value of the SSB identifier may correspond to the number of at least one candidate transmission location. The method may further include converting the acquired SSB identifier according to a correspondence relationship between the number of the at least one candidate transmission location and the number of SSBs in one time interval. Further, the operation of determining the subframe number corresponding to the acquired SSB identifier may include determining a subframe number corresponding to the converted SSB identifier.

The technical solution provided in the embodiment of the present disclosure may have the following beneficial effects. In the embodiment, the UE may recognize the parsed out SSB identifier and convert the SSB identifier into an SSB identifier that may correspond to the subframe number, to implement synchronization processing.

In an embodiment, the operation of parsing the SSB according to the synchronization broadcast transmission, for acquiring the SSB identifier may include parsing a DMRS sequence of a PBCH in the SSB and data bits in the PBCH according to the synchronization broadcast transmission, and acquiring the SSB identifier through the DMRS sequence of the PBCH in the SSB and the data bits in the PBCH.

The technical solution provided in the embodiment of the present disclosure may have the following beneficial effects. In the embodiment, the UE may acquire the SSB identifier from the DMRS sequence of the PBCH and the data bits in the PBCH, and an implementation solution is provided.

According to a third aspect of the embodiments of the present disclosure, a method for transmitting a synchronization broadcast transmission can be provided, which may include receiving the synchronization broadcast transmission from a base station, and parsing a synchronization signal/physical broadcast channel block (SSB) according to the synchronization broadcast transmission, for acquiring an SSB identifier. The parsing the SSB, for acquiring the SSB identifier can also include deriving the SSB identifier according to a correspondence relationship between a number of at least one candidate transmission location and a number of SSBs in one time interval, wherein one of the at least one candidate transmission location is corresponding to the SSB, and the number of the at least one candidate transmission location is greater than the number of SSBs in the one time interval.

The technical solution provided in the embodiment of the present disclosure may have the following beneficial effects. In the embodiment, UE may parse the SSB identifier, and implement synchronization with a network side.

In an embodiment, the operation of deriving the SSB identifier may include parsing a DMRS sequence of a PBCH in the SSB and data bits in the PBCH according to the synchronization broadcast transmission, and acquiring the SSB identifier through the DMRS sequence of the PBCH in the SSB and the data bits in the PBCH.

The technical solution provided in the embodiment of the present disclosure may have the following beneficial effects. In the embodiment, the UE may acquire the SSB identifier from the DMRS sequence of the PBCH and the data bits in the PBCH. An implementation solution is provided.

According to a fourth aspect of the embodiments of the present disclosure, a device for transmitting a synchronization broadcast transmission is provided. The device can include a location module that is configured to determine at least one candidate transmission location corresponding to at least one SSB to be transmitted, wherein a number of the at least one candidate transmission location is greater than a number of SSBs in one time interval. The device can further include a generation module that is configured to generate the synchronization broadcast transmission including the at least one SSB, and a broadcast module that is configured to transmit the generated synchronization broadcast transmission at the at least one candidate transmission location in a beam sweeping manner. Of course, it should be understood that one or more of the module described in this disclosure can be implemented by processing circuitry.

In an embodiment, the number of the at least one candidate transmission location may be n times the number of SSBs in one time interval, n is equal to 2 or n is a ratio of a duration of a time interval to a duration of a half frame.

In an embodiment, the synchronization broadcast transmission may further include at least one SSB identifier of the at least one SSB, the at least one SSB identifier may be carried in the at least one SSB, and a maximum value of the at least one SSB identifier may correspond to the number of SSBs in one time interval, or the maximum value of the at least one SSB identifier may correspond to the number of the at least one candidate transmission location.

In an embodiment, the at least one SSB identifier may be transmitted through a DMRS sequence of a PBCH in the SSB and data bits in the PBCH.

In an embodiment, the broadcast module may include a broadcast submodule that is configured to transmit the generated synchronization broadcast transmission at the at least one candidate transmission location in a selected candidate transmitting slot in the beam sweeping manner. Further, a candidate set of the candidate transmitting slot being {10, 20, 40, 80, 160}ms, or the candidate set of the candidate transmitting slot being {5, 10, 20, 40, 80, 160}ms in response to that the number of SSBs in one time interval is 4 and the candidate set of the candidate transmitting slot being {10, 20, 40, 80, 160}ms in response to that the number of SSBs in one time interval is greater than 4.

In an embodiment, at least two SSBs to be transmitted may belong to a group. The device may further include a detection module that is configured to detect whether the at least one candidate transmission location is idle or not, a group module that is configured to, in response to that the at least one candidate transmission location is not idle, determine all SSBs in a group to which the at least one SSB to be transmitted belongs, and a waiving module that is configured to waive transmission of the generated synchronization broadcast transmission at the at least one candidate transmission location corresponding to all the SSBs in the group in the beam sweeping manner.

According to a fifth aspect of the present disclosure, a device for transmitting a synchronization broadcast transmission is provided. The device can include a receiving module, configured to receive synchronization broadcast transmission from a base station, a parsing module, configured to parse an SSB according to the synchronization broadcast transmission for acquiring an SSB identifier, and a determination module, configured to determine a subframe number corresponding to the acquired SSB identifier according to a preset correspondence relationship between SSB identifiers and subframe numbers.

In an embodiment, a maximum value of the SSB identifier may correspond to the number of the at least one candidate transmission location. The device may further include a conversion module that is configured to convert the acquired SSB identifier according to a correspondence relationship between the number of the at least one candidate transmission location and the number of SSBs in one time interval. The determination module may include a determination submodule that is configured to determine a subframe number corresponding to the converted SSB identifier.

In an embodiment, the parsing module may include a parsing submodule that is configured to parse a DMRS sequence of a PBCH in the SSB and data bits in the PBCH according to the synchronization broadcast transmission, and an acquisition submodule that is configured to acquire the SSB identifier through the DMRS sequence of the PBCH in the SSB and the data bits in the PBCH.

According to a sixth aspect of the present disclosure, a device for transmitting a synchronization broadcast transmission is provided that may include a processor and a memory configured to store instructions executable by the processor. The processor may be configured to determine at least one candidate transmission location corresponding to at least one SSB to be transmitted, wherein a number of the at least one candidate transmission location is greater than a number of SSBs in one time interval. Further, the processor can be configure to generate the synchronization broadcast transmission including the at least one SSB, and transmit the generated synchronization broadcast transmission at the at least one candidate transmission locations in a beam sweeping manner.

According to a seventh aspect of the present disclosure, a device for transmitting a synchronization broadcast transmission is provided that may include a processor and a memory configured to store instructions executable by the processor. The processor may be configured to receive synchronization broadcast transmission from a base station, parse an SSB according to the synchronization broadcast transmission and acquire an SSB identifier, and determine a subframe number corresponding to the acquired SSB identifier according to a preset correspondence relationship between an SSB identifier and a subframe number.

According to an eighth aspect of the present disclosure, a device for transmitting a synchronization broadcast transmission is provided that may include a processor and a memory configured to store instructions executable by the processor. The processor may be configured to receive synchronization broadcast transmission from a base station, and parse an SSB according to the synchronization broadcast transmission and acquire an SSB identifier. Further, in parsing the SSB for acquiring the SSB identifier, the processor is configured to derive the SSB identifier according to a correspondence relationship between a number of at least one candidate transmission locations and a number of SSBs in one time interval, wherein one of the at least one candidate transmission location is corresponding to the SSB, and the number of the at least one candidate transmission location is greater than the number of SSBs in the one time interval.

According to a ninth aspect of the present disclosure, a non-transitory computer-readable storage medium is provided, in which a computer instruction may be stored, the instructions being executed by a processor to implement the method applied to a base station side.

According to a tenth aspect of the present disclosure, a non-transitory computer-readable storage medium is provided, in which a computer instruction may be stored, the instructions being executed by a processor to implement the method applied to a UE side.

FIG. 1 is a flow chart showing a method for transmitting a synchronization broadcast transmission according to an exemplary embodiment. The method for transmitting a synchronization broadcast transmission is applied to a network access device such as a base station. As shown in FIG. 1, the method includes the following Step 101 to Step 103.

In Step 101, at least one candidate transmission location corresponding to at least one SSB to be transmitted is determined, wherein a number of the at least one candidate transmission location is greater than a number of SSBs in one time interval.

In Step 102, synchronization broadcast transmission including the at least one SSB is generated.

In Step 103, the generated synchronization broadcast transmission is transmitted at the at least one candidate transmission location in a beam sweeping manner.

In the embodiment, the number of SSBs in one time interval is pre-configured by a system according to a frequency band, and is the maximum number of SSBs that may be transmitted in one time interval. The number of the at least one candidate transmission location is also pre-configured by the system, and is a maximum number of candidate transmission locations in one time interval.

In the related art, the number of the at least one candidate transmission location is no greater than the number of SSBs in one time interval. In the embodiment, the number of the at least one candidate transmission location is greater than the number of SSBs in one time interval. More candidate transmission locations are provided, and a larger number of beams carrying synchronization broadcast transmission in more possible directions are also provided. When a certain candidate transmission location is occupied by another resource, the base station may have a relatively larger number of other candidate transmission locations for transmission of the synchronization broadcast transmission. Therefore, there are more opportunities for the base station to transmit the synchronization broadcast transmission in one time interval, which is favorable for UE to timely find the synchronization broadcast transmission for synchronization processing.

Figure 2:
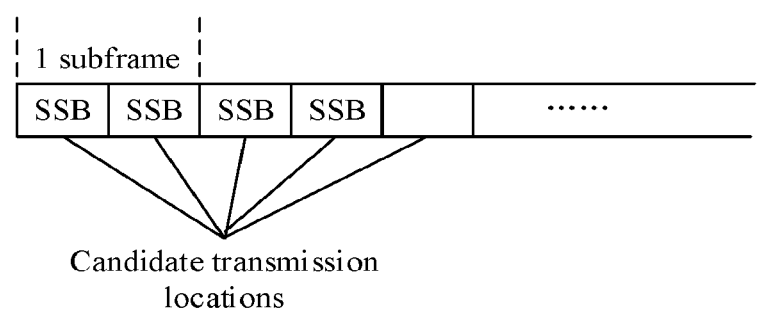
FIG. 2 is a schematic diagram illustrating an SSB according to an exemplary embodiment.

For example, as shown in FIG. 2, the number of SSBs in one time interval is 4 (namely L is equal to 4), that is, at most four SSBs are transmitted in one time interval. At most two SSBs are transmitted in a subframe. In the embodiment, the number of the at least one candidate transmission location is greater than the number of SSBs in one time interval. That is, When L is equal to 4, the number of the at least one candidate transmission location is at least equal to 5. When L is equal to 8, the number of the at least one candidate transmission location is at least equal to 9. L may also be 64 and the like. The principle is the same as the above and will not be elaborated herein. The number of the at least one candidate transmission location may be determined according to a configuration of the number of SSBs in one time interval. In a different frequency bans, the number of SSBs in one time interval is different, and the number of the at least one candidate transmission location is changed accordingly. A subframe and a location in the subframe corresponding to each candidate transmission location may be configured flexibly, and the locations may be discontinuous or may be continuous.

The base station may notify the UE of all configured candidate transmission location(s) and corresponding subframe(s) as well as corresponding half frames in advance.

The base station firstly determines an SSB identifier of the SSB to be transmitted, then determines the candidate transmission location corresponding to the SSB identifier, and then transmits the generated synchronization broadcast transmission at the candidate transmission location in a beam sweeping manner.

In an embodiment, there may be multiple options for the number of the at least one candidate transmission location. For example, the number of the at least one candidate transmission location is n times the number of SSBs in one time interval, n is equal to 2 or n is a ratio of a duration of a time interval to a duration of a half frame.

The number of the at least one candidate transmission location is an integral multiple of SSBs in one time interval, which facilitates the base station to manage and control the at least one candidate transmission location, conveniently set SSB identifier, and notify the UE of a correspondence relationship between an SSB identifier and a subframe number, and facilitates the UE to recognize the SSB identifier.

Taking that n is equal to 2 as an example, when L is equal to 4, the number of the candidate transmission locations is 8. When L is equal to 8, the number of the candidate transmission locations is 16. For another example, n is a ratio of a duration of a time interval to a duration of a half frame. If the duration of the time interval is 20 ms and the duration of the half frame is 5 ms, n is equal to 4. When L is equal to 4, the number of the candidate transmission locations is 16. When L is equal to 8, the number of the candidate transmission locations is 32. That is, the candidate transmission locations may be configured in four half frames, more candidate transmission locations are provided in one time interval, and the candidate transmission locations are distributed in multiple half frames. Even if a half frame is missed, the SSB may also be transmitted in other half frames in one time interval, and there are more options and transmission opportunities.

In an embodiment, the synchronization broadcast transmission further includes at least one SSB identifier of the at least one SSB, and the at least one SSB identifier is carried in the at least one SSB.

A maximum value of the at least one SSB identifier corresponds to the number of SSBs in one time interval. Or, the maximum value of the at least one SSB identifier corresponds to the number of the at least one candidate transmission location.

Figure 3:
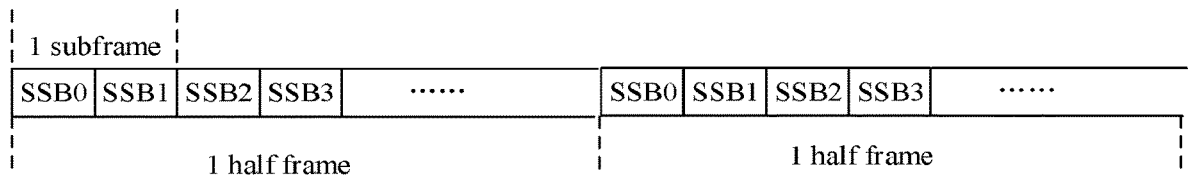
FIG. 3 is a schematic diagram illustrating an SSB according to specific embodiment 1.

Taking that n is equal to 2 as an example, when L is equal to 4, the number of the candidate transmission locations is 8, which correspond to 8 SSBs. There are multiple solutions on configuration of SSB identifiers of the 8 SSBs. A first solution, the maximum value of the SSB identifiers corresponds to the number of SSBs in one time interval. When L is equal to 4, the maximum value of the SSB identifiers is 3, and the SSBs are numbered from 0 to be SS0, SS1, SSB2 and SSB3. The number of the candidate transmission locations is 8, and thus there are two groups of SSB0, SSB1, SSB2 and SSB3, as shown in FIG. 3. The two groups of SSBs may be in the same half frame, or the two groups of SSBs may be in two half frames respectively, one group of SSBs are in in one half frame. The half frames and the subframes in the half frames, which are determined as candidate transmission locations, may be configured flexibly.

Although there are totally 8 SSBs, at most four SSBs are transmitted in one time interval. There is a fixed correspondence relationship between candidate transmission locations and SSB identifiers. Once at least one candidate transmission location is selected, the corresponding at least one SSB identifier is transmitted at the at least one candidate transmission location, and is unrelated to previously transmitted SSB identifier.

Figure 4:
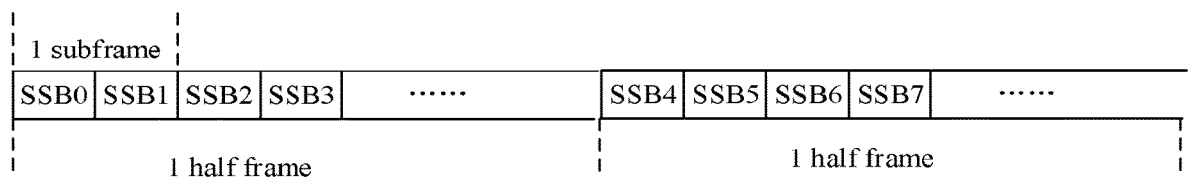
FIG. 4 is a schematic diagram illustrating an SSB according to an exemplary embodiment.

A second solution: the maximum value of the SSB identifiers corresponds to the number of the at least one candidate transmission location. When the number of the candidate transmission locations is 8, the maximum value of the SSB identifiers is 7, and the SSBs are numbered from 0 to be SS0, SS1, SSB6 and SSB1. As shown in FIG. 4, similarly, although there are totally 8 SSBs, at most four SSBs are transmitted in one time interval. There is a fixed correspondence relationship between candidate transmission locations and SSB identifiers. Once at least one candidate transmission location is selected, the corresponding at least one SSB identifier is transmitted at the candidate transmission location, and is unrelated to previously transmitted SSB identifier.

In an embodiment, the at least one SSB identifier is transmitted through both a DMRS sequence of a PBCH and data bits in the PBCH in the SSB.

Taking that n is equal to 2 as an example, when the second solution is adopted, the maximum value of the at least one SSB identifier corresponds to the number of the at least one candidate transmission location. When L is equal to 4, the number of the candidate transmission locations is 8, the maximum value of the SSB identifiers is 7, and the SSB identifier occupies three bits. When L is equal to 8, the number of the candidate transmission locations is 16, the maximum value of the SSB identifiers is 15, and the SSB identifier occupies four bits. When L is equal to 64, the number of the candidate transmission locations is 128, the maximum value of the SSB identifiers is 127, and the SSB identifier occupies six bits. Therefore, the number of bits reserved for the SSB identifier in the DMRS sequence of the PBCH in the related art may not meet the requirement, and the data bits in the PBCH is used in the embodiment. The at least one SSB identifier is transmitted by use of both the DMRS sequence of the PBCH and the data bits in the PBCH. The SSB identifier may occupy lower three bits in the DMRS sequence of the PBCH and three data bits in the PBCH. The base station transmits the subframe where the SSB is actually transmitted and an SSB identifier in the subframe to the UE in Remaining Minimum System Information (RMSI).

In an embodiment, S103 includes Step A.

In Step A, the generated synchronization broadcast transmission is transmitted at the at least one candidate transmission location in a selected candidate transmitting slot in the beam sweeping manner.

A candidate set of the candidate transmitting slot is {10, 20, 40, 80, 160}ms. Alternatively, a candidate set of the candidate transmitting slot is {5, 10, 20, 40, 80, 160}ms when the number of SSBs in one time interval is 4, and the candidate set of the candidate transmitting slot is {10, 20, 40, 80, 160}ms when the number of SSBs in one time interval is greater than 4.

It can be seen from the above that, in the embodiment, the number of the at least one candidate transmission location is increased, and multiple candidate transmission locations may correspond to multiple subframes. Taking that the duration of the half frame is 5 ms as an example, when L is equal to 8 and n is equal to 2, the number of the candidate transmission locations is 16, at least corresponding to 8 subframes and two half frames. If the candidate transmitting slot is 5 ms, and another candidate transmitting slot is reached at 10 ms, the requirement of two half frames may not be met. Therefore, in the embodiment, a candidate set of the candidate transmitting slot is {10, 20, 40, 80, 160}ms when L is equal to 4, 8, 64 and n is at least 2. Or, a candidate set of the candidate transmitting slot is {5, 10, 20, 40, 80, 160}ms when the number of SSBs in one time interval is 4, and a candidate set of the candidate transmitting slot is {10, 20, 40, 80, 160}ms when the number of SSBs in one time interval is greater than 4.

In an embodiment, the method further includes Step B1 and Step B2.

In Step B1, whether a candidate transmission location is idle or not is detected.

In Step B2, when it is detected that the candidate transmission location is not idle, transmission of the generated synchronization broadcast transmission at the candidate transmission location in the beam sweeping manner is waived. A next candidate transmission location is determined, which is equivalent to Step 101.

When it is detected that the candidate transmission location is idle, Step 102 is continued.

The base station, after selecting a candidate transmission location, detects whether the candidate transmission location is idle or not. If YES, the candidate transmission location may be adopted to transmit the SSB. If NO, another candidate transmission location is required to be selected. The reselected candidate transmission location may be a next candidate transmission location adjacent to the candidate transmission location or may be a candidate transmission location spaced from the candidate transmission location by L candidate transmission locations. For example, when a presently selected candidate transmission location corresponds to an SSB0 and the presently selected candidate transmission location is not idle, transmission of the SSB0 is waived, and candidate transmission location corresponding to an SSB1 is selected or a candidate transmission location corresponding to SSB0+L is selected. For another example, the SSB0 and the SSB2 are expected to be transmitted, and if the candidate transmission location corresponding to the SSB0 is not idle, the SSB1 and the SSB2 are transmitted instead, or the SSB2 and SSB0+L are transmitted instead. In an embodiment, at least two SSBs to be transmitted belong to a group.

The method further includes Step B1, Step B3 and Step B4.

In Step B1, whether the at least one candidate transmission location is idle or not is detected. In Step B3, when the at least one candidate transmission location is not idle, all SSBs in a group to which the at least one SSB to be transmitted belongs are determined. In Step B4, transmission of the generated synchronization broadcast transmission at the at least one candidate transmission location corresponding to all the SSBs in the group in the beam sweeping manner is waived.

When a candidate transmission location is idle, a next SSB to be transmitted in the group is determined, and whether a candidate transmission location corresponding to the next SSB is idle or not is detected. When all the candidate transmission locations corresponding to all the SSBs in the group are idle, the synchronization broadcast transmission is transmitted at the corresponding candidate transmission locations in the beam sweeping manner.

According to the embodiment, multiple SSBs are classified into a group in advance. For example, the SSB1 and the SSB2 belong to a group. An SSB presently to be transmitted is the SSB1. Whether the candidate transmission location corresponding to the SSB1 is idle or not is detected, and if NO, it is determined that a group where the SSB1 is located further includes the SSB2, the candidate transmission location corresponding to the SSB2 is determined, and transmission of the generated synchronization broadcast transmission at the candidate transmission locations corresponding to the SSB1 and the SSB2 in the beam sweeping manner are waived. The base station may also transmit the SSB1 and the SSB2 or transmit other SSBs at other candidate transmission locations.

In the embodiment, the SSB group is proposed, and multiple SSBs are classified into a group. All the SSBs in a group are managed and controlled in a unified manner, and their transmissions are performed in the unified manner or waived in the unified manner, so that convenience is brought to centralized management of the SSBs.

An implementation process will be introduced below through an embodiment in detail.

Figure 5:
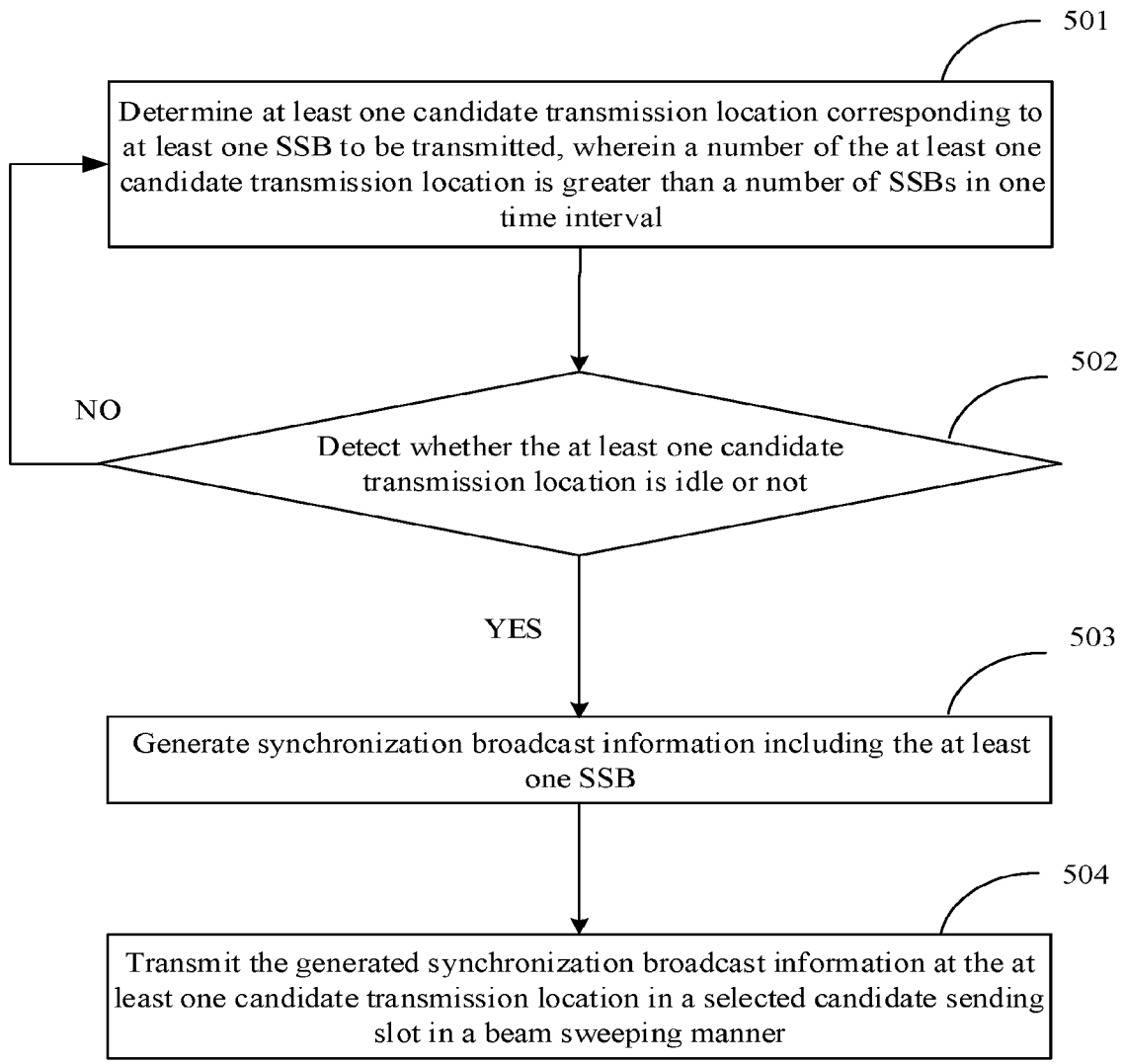
FIG. 5 is a flow chart showing a method for transmitting a synchronization broadcast transmission according to specific embodiment 1.

FIG. 5 is a flow chart showing a method for transmitting a synchronization broadcast transmission according to an exemplary embodiment. The method for transmitting a synchronization broadcast transmission is applied to a network access device such as a base station. As shown in FIG. 5, the method includes the following Step 501 to Step 502.

In Step 501, a candidate transmission location corresponding to an SSB to be transmitted is determined, wherein a number of candidate transmission locations is greater than a number of SSBs in one time interval.

In Step 502, it is detected whether the candidate transmission location is idle or not, and when it is detected that the candidate transmission locations is not idle, transmission of generated synchronization broadcast transmission at the candidate transmission location in a beam sweeping manner is waived. A next candidate transmission location is determined, which is equivalent to Step 501. When it is detected that the candidate transmission location is idle, Step 503 is performed.

In Step 503, the synchronization broadcast transmission including the SSB is generated.

In Step 504, the generated synchronization broadcast transmission is transmitted at the candidate transmission location in a selected candidate transmitting slot in the beam sweeping manner.

The implementation process of transmission of the synchronization broadcast transmission at a base station side is introduced above. Correspondingly, a UE side is required to correspondingly receive the synchronization broadcast transmission and perform synchronization processing. An implementation process of the UE side will be introduced below.

Figure 6A:
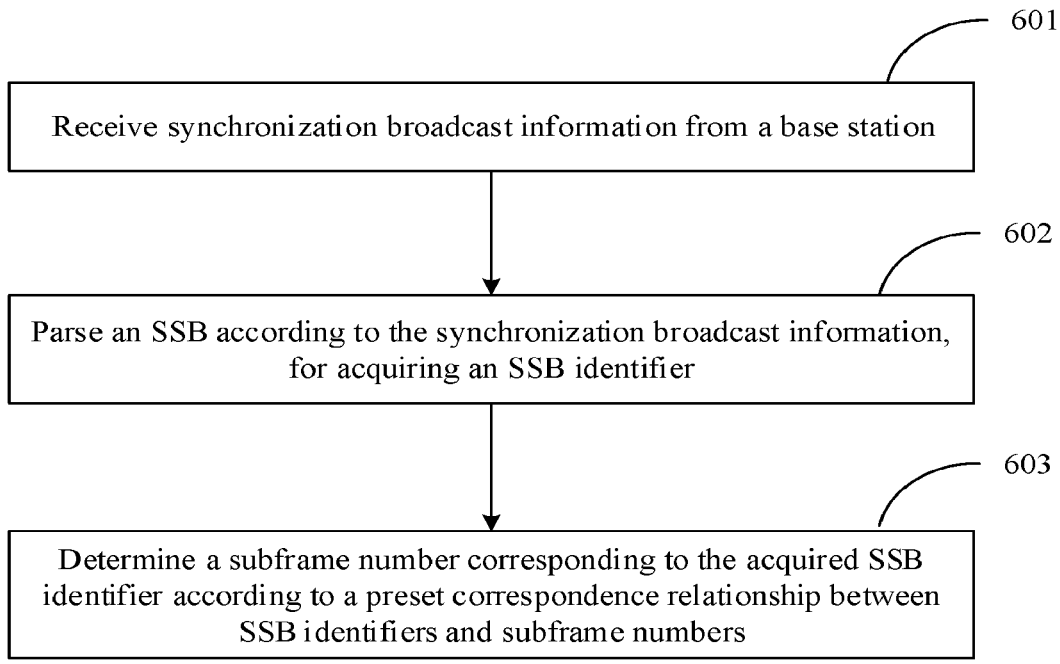
FIG. 6A is a flow chart showing a method for transmitting a synchronization broadcast transmission according to specific embodiment 1.

FIG. 6A is a flow chart showing a method for transmitting a synchronization broadcast transmission according to an exemplary embodiment. The method for transmitting a synchronization broadcast transmission is adapted for a network access device such as a base station. A terminal may be a mobile phone, a computer, a digital broadcast terminal, a messaging device, a gaming console, a tablet, a medical device, exercise equipment, a personal digital assistant and the like. As shown in FIG. 6A, the method includes the following Step 601 to Step 603.

In Step 601, synchronization broadcast transmission from a base station is received.

In Step 602, an SSB is parsed according to the synchronization broadcast transmission, for acquiring an SSB identifier.

In Step 603, a subframe number corresponding to the acquired SSB identifier is determined according to a preset correspondence relationship between SSB identifiers and subframe numbers.

As shown in FIG. 3 and FIG. 4, UE may acquire a subframe where the SSB is located and the SSB identifier in the subframe in advance through RMSI. When the UE parses the SSB identifier, the corresponding subframe number may be determined, and a beam direction of the SSB identifier may further be determined as a reference for uplink signal transmission to complete synchronization.

In an embodiment, a maximum value of the at least one SSB identifier corresponds to the number of at least one candidate transmission location.

The method further includes Step C1.

In Step C1, the acquired SSB identifier is converted according to a correspondence relationship between the number of the at least one candidate transmission location and the number of SSBs in one time interval.

Step 603 includes Step C2. In Step C2, a subframe number corresponding to the converted SSB identifier is determined.

Taking that n is equal to 2 and L is equal to 4 as an example, the number of the candidate transmission locations is 8, and SSB identifiers include SSB0, SSB1, SSB6 and SSB7. One group of SSBs include SSB0, SSB1, SSB2 and SSB3, and the other group of SSBs include SSB4, SSB5, SSB6 and SSB7. The two groups of SSBs are in two half frames respectively. In this case, a correspondence relationship between SSB identifiers and subframe numbers may be simplified as Table 1.

TABLE 1

| SSB identifier | Subframe number |
|---|---|
| SSB0 | Subframe 0 |
| SSB1 | Subframe 1 |
| SSB2 | Subframe 2 |
| SSB3 | Subframe 3 |

Therefore, compatibility with a notification manner for the correspondence relationship between the SSB identifiers and the subframe numbers in the related art may be achieved. For example, the UE recognizes that the SSB identifier is SSB6 and converts the acquired SSB identifier according to the correspondence relationship between the number of the candidate transmission locations and the number of SSBs in one time interval. In the example, n is equal to 2, SSB6 divided by 2, rounded up, and then minus 1 (since numbering is started from 0) is SSB2. It is determined that a subframe number corresponding to SSB2 is subframe 2.

Of course, Table 1 may also be changed to a correspondence relationship between SSB0, SSB1, . . . , SSB6 and SSB1 and subframe numbers, and a correspondence relationship between SSB identifiers and subframe numbers as well as half frame numbers may be added.

If the maximum value of the at least one SSB identifier corresponds to the number of SSBs in one time interval, the UE may directly determine the corresponding subframe number according to Table 1 without converting the SSB identifier.

In an embodiment, S602 includes Step D1 to Step D2.

In Step D1, a DMRS sequence of a PBCH in the SSB and data bits in the PBCH are parsed according to the synchronization broadcast transmission.

In Step D2, the SSB identifier is acquired through the DMRS sequence of the PBCH in the SSB and the data bits in the PBCH.

The UE learns in advance that the SSB identifier is transmitted in the DMRS of the PBCH and the data bits in the PBCH. The DMRS sequence of the PBCH carries lower three bits in the SSB identifier, and the data bits in the PBCH carries higher two bits in the SSB identifier.

The implementation process will be introduced below through an embodiment in detail.

Figure 7:
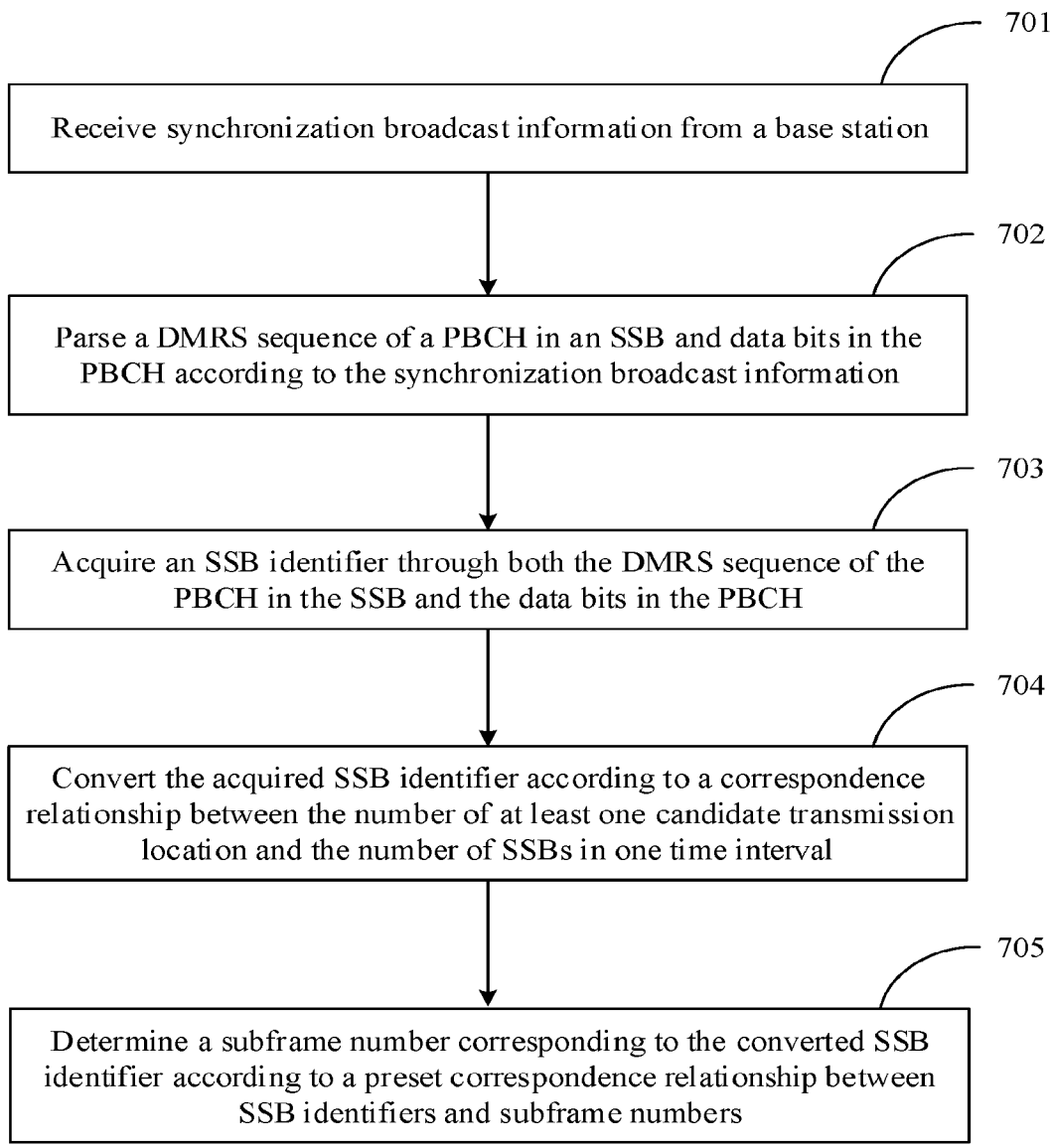
FIG. 7 is a flow chart showing a method for transmitting a synchronization broadcast transmission according to an exemplary embodiment.

FIG. 7 is a flow chart showing a method for transmitting a synchronization broadcast transmission according to an exemplary embodiment. The method for transmitting a synchronization broadcast transmission is applied a network access device such as a base station. A terminal may be a mobile phone, a computer, a digital broadcast terminal, a messaging device, a gaming console, a tablet, a medical device, exercise equipment, a personal digital assistant and the like. As shown in FIG. 7, the method includes the following Step 701 to Step 703.

In Step 701, synchronization broadcast transmission from a base station is received.

In Step 702, a DMRS sequence of a PBCH in an SSB and a data bits in the PBCH are parsed out according to the synchronization broadcast transmission.

In Step 703, an SSB identifier is acquired through the DMRS sequence of the PBCH in the SSB and the data bits in the PBCH.

In Step 704, the acquired SSB identifier is converted according to a correspondence relationship between the number of candidate transmission locations and the number of SSBs in one time interval.

In Step 705, a subframe number corresponding to the converted SSB identifier is determined according to a preset correspondence relationship between SSB identifiers and subframe numbers.

The embodiments may be freely combined as required.

Figure 6B:
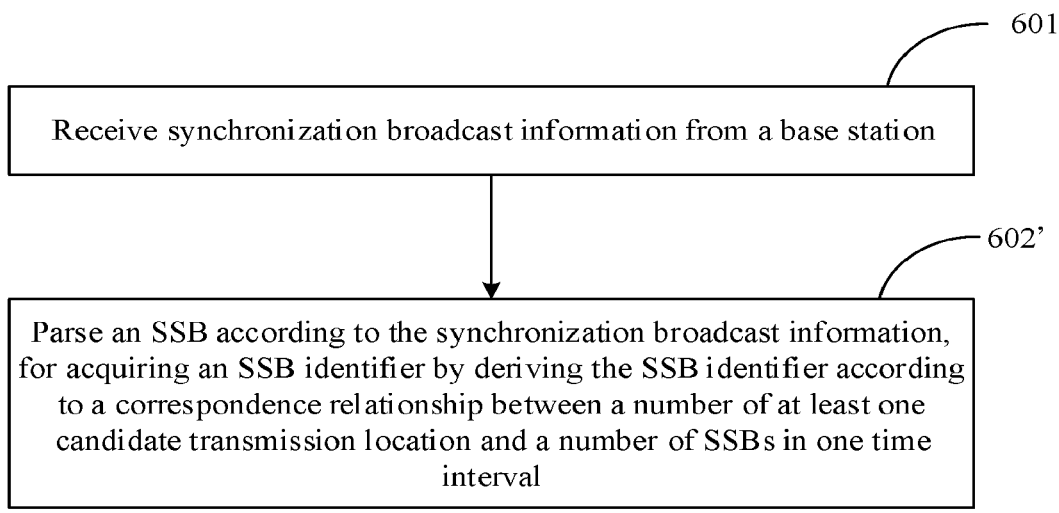
FIG. 6B is a flow chart showing another method for transmitting a synchronization broadcast transmission according to specific embodiment 1.

FIG. 6B is a flow chart showing another method for transmitting a synchronization broadcast transmission according to specific embodiment 1. As shown in FIG. 6B, the method includes the following Step 601 to Step 602'.

In Step 601, synchronization broadcast transmission from a base station is received.

In Step 602', an SSB is parsed according to the synchronization broadcast transmission, for acquiring an SSB identifier.

In Step 602', the operation of parsing the SSB according to the synchronization broadcast transmission, for acquiring the SSB identifier can include deriving the SSB identifier according to a correspondence relationship between a number of at least one candidate transmission location and a number of SSBs in one time interval, wherein one of the at least one candidate transmission location is corresponding to the SSB, and the number of the at least one candidate transmission location is greater than the number of SSBs in the one time interval.

In an embodiment, the operation of deriving the SSB identifier may include parsing a demodulation reference signal (DMRS) sequence of a physical broadcast channel (PBCH) in the SSB and data bits in the PBCH according to the synchronization broadcast transmission, and acquiring the SSB identifier through the DMRS sequence of the PBCH in the SSB and the data bits in the PBCH.

The below is a device embodiment of the present disclosure and may be configured to execute the method embodiment of the present disclosure.

Figure 8:
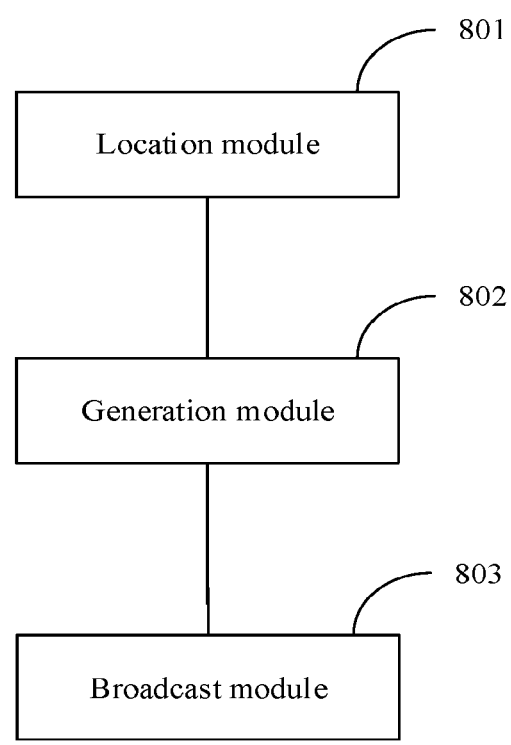
FIG. 8 is a block diagram of a device for transmitting a synchronization broadcast transmission according to specific embodiment 1.

FIG. 8 is a block diagram of a device for transmitting a synchronization broadcast transmission, according to an exemplary embodiment. The device may be implemented as part or whole of an electronic device through software, hardware or a combination of the two. Referring to FIG. 8, the device for transmitting a synchronization broadcast transmission includes a location module 801, a generation module 802, and a broadcast module 803.

The location module 801 is configured to determine at least one candidate transmission location corresponding to at least one SSB to be transmitted, wherein a number of the at least one candidate transmission location is greater than a number of SSBs in one time interval.

The generation module 802 is configured to generate synchronization broadcast transmission including the at least one SSB.

The broadcast module 803 is configured to transmit the generated synchronization broadcast transmission at the at least one candidate transmission location in a beam sweeping manner.

In an embodiment, the number of at least one candidate transmission location is n times the number of SSBs in one time interval, n is equal to 2 or n is a ratio of a duration of a time interval to a duration of a half frame.

In an embodiment, the synchronization broadcast transmission further includes at least one SSB identifier of the at least one SSB; the at least one SSB identifier is carried in the at least one SSB.

The maximum value of the at least one SSB identifier corresponds to the number of SSBs in one time interval. Alternatively, the maximum value of the at least one SSB identifier corresponds to the number of at least one candidate transmission location. In an embodiment, the at least one SSB identifier is transmitted through both a DMRS sequence of a PBCH in the SSB and data bits in the PBCH.

Figure 9A:
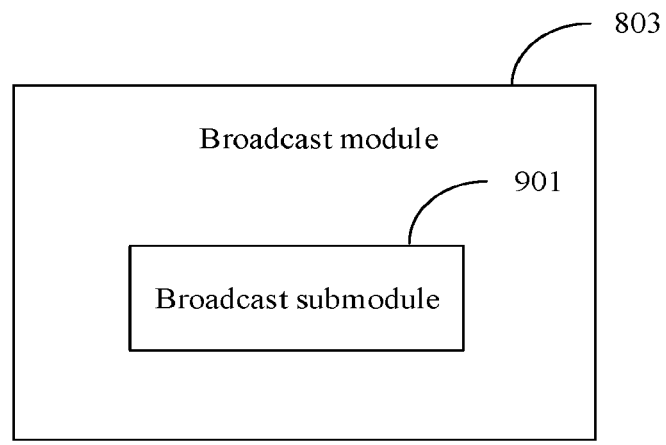
FIG. 9A is a block diagram of a broadcast module according to specific embodiment 1.

In an embodiment, as shown in FIG. 9A, the broadcast module 803 includes a broadcast submodule 901. The broadcast submodule 901 is configured to transmit the generated synchronization broadcast transmission at the at least one candidate transmission location in a selected candidate transmitting slot in the beam sweeping manner.

A candidate set of the candidate transmitting slot is {10, 20, 40, 80, 160}ms. Alternatively, a candidate set of the candidate transmitting slot is {5, 10, 20, 40, 80, 160}ms when the number of SSBs in one time interval is 4, and a candidate set of the candidate transmitting slot is {10, 20, 40, 80, 160}ms when the number of SSBs in one time interval is greater than 4.

In an embodiment, at least two SSBs to be transmitted belong to a group.

Figure 9B:
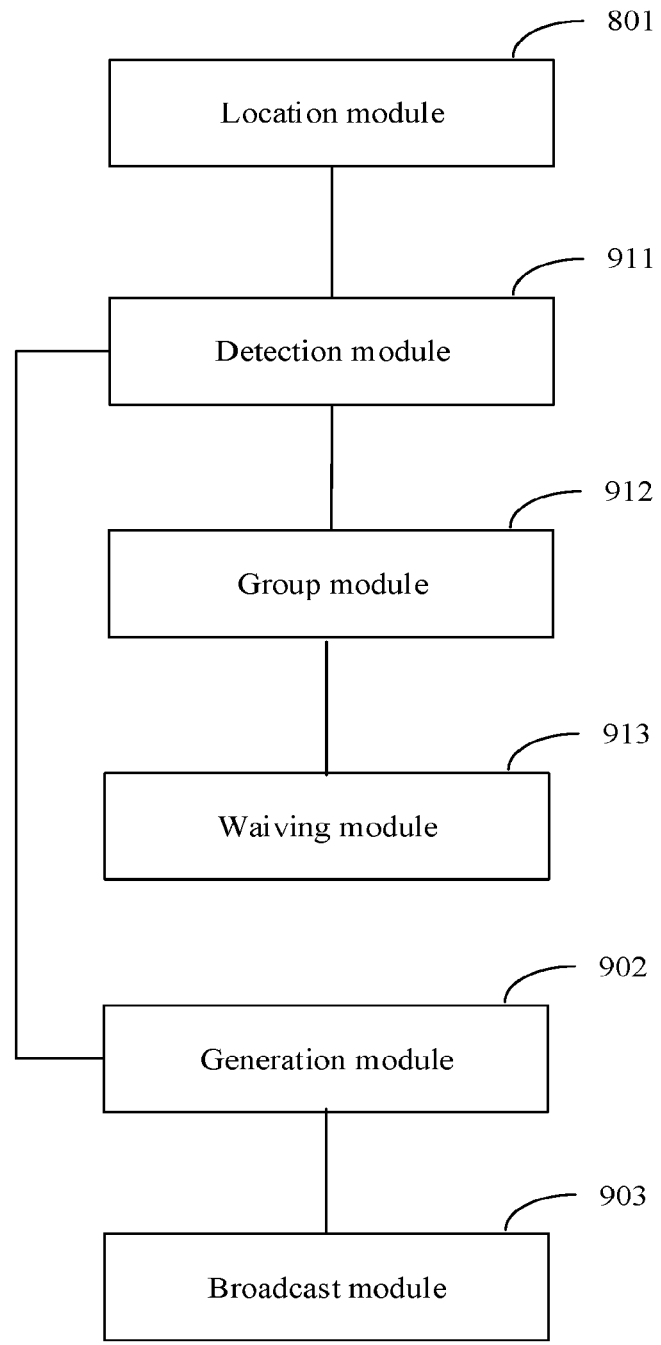
FIG. 9B is a block diagram of a device for transmitting a synchronization broadcast transmission according to an exemplary embodiment.

As shown in FIG. 9B, the device further includes a detection module 911, a group module 912 and a waiving module 913.

The detection module 911 is configured to detect whether the at least one candidate transmission location is idle or not.

The group module 912 is configured to, when the at least one candidate transmission location is not idle, determine all SSBs in a group to which the at least one SSB to be transmitted belongs.

The waiving module 913 is configured to waive transmission of the generated synchronization broadcast transmission at the at least one candidate transmission location corresponding to all the SSBs in the group in the beam sweeping manner.

Figure 10A:
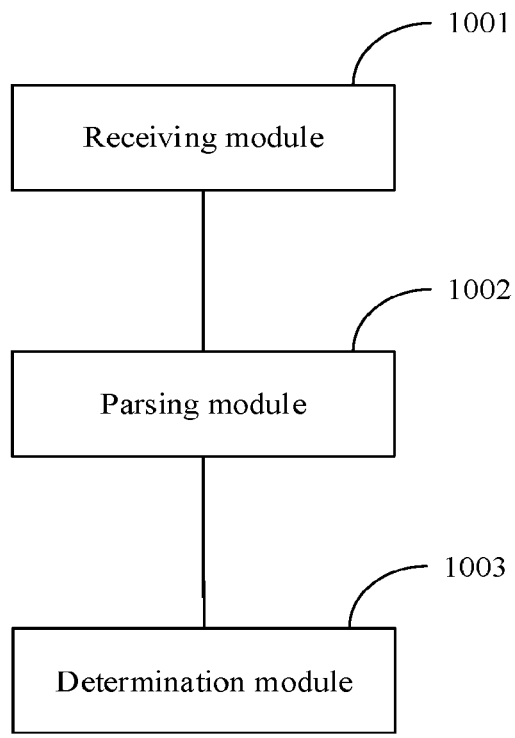
FIG. 10A is a block diagram of a device for transmitting a synchronization broadcast transmission according to an exemplary embodiment.

FIG. 10A is a block diagram of a device for transmitting a synchronization broadcast transmission according to an exemplary embodiment. The device may be implemented as a part or whole of an electronic device through software, hardware or a combination of the two. Referring to FIG. 10A, the device for transmitting a synchronization broadcast transmission includes a receiving module 1001, a parsing module 1002 and a determination module 1003.

The receiving module 1001 is configured to receive synchronization broadcast transmission from a base station.

The parsing module 1002 is configured to parse an SSB according to the synchronization broadcast transmission, for acquiring an SSB identifier.

The determination module 1003 is configured to determine a subframe number corresponding to the acquired SSB identifier according to a preset correspondence relationship between SSB identifiers and subframe numbers.

In an embodiment, a maximum value of the SSB identifier corresponds to the number of at least one candidate transmission location.

Figure 11:
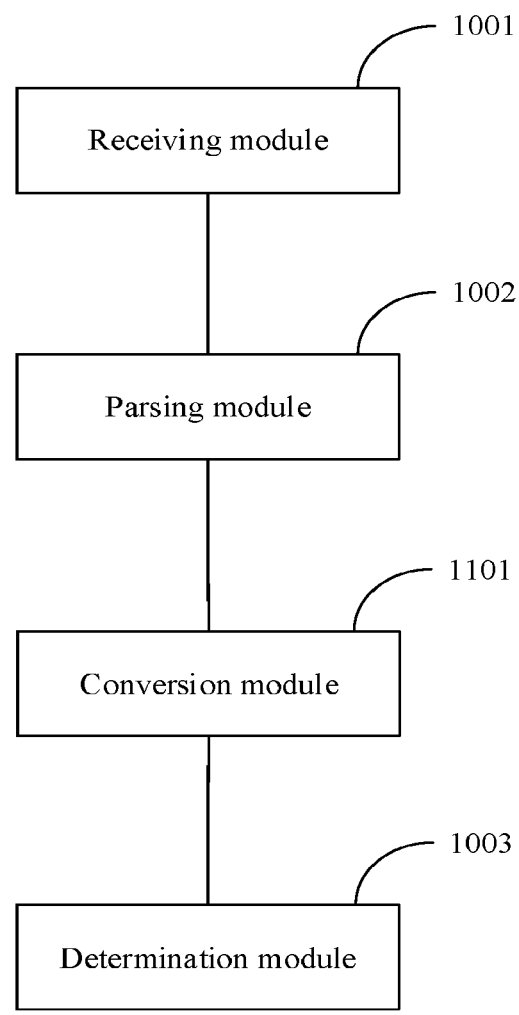
FIG. 11 is a block diagram of a device for transmitting a synchronization broadcast transmission according to specific embodiment 2.

As shown in FIG. 11, the device further includes a conversion module 1101.

The conversion module 1101 is configured to convert the acquired SSB identifier according to a correspondence relationship between the number of candidate transmission locations and the number of SSBs in one time interval.

Figure 12:
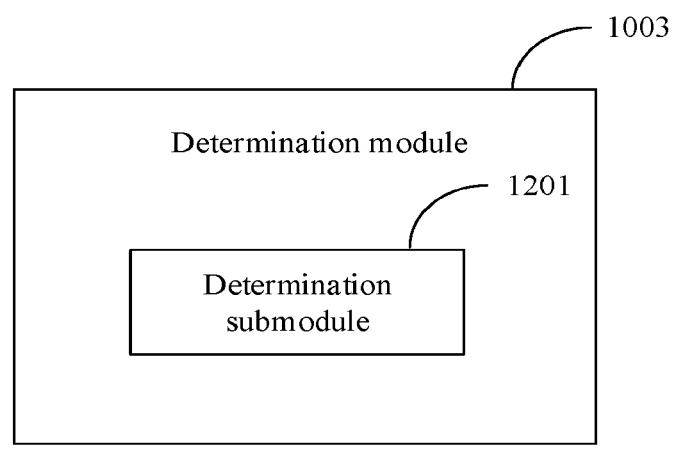
FIG. 12 is a block diagram of a determination module according to an exemplary embodiment.

As shown in FIG. 12, the determination module 1003 includes a determination submodule 1201.

The determination submodule 1201 is configured to determine a subframe number corresponding to the converted SSB identifier.

Figure 13:
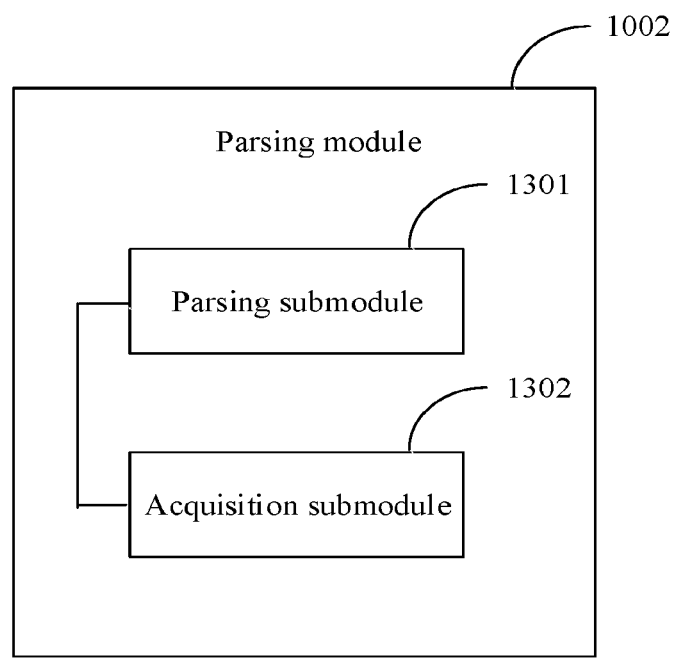
FIG. 13 is a block diagram of a parsing module according to specific embodiment 2.

In an embodiment, as shown in FIG. 13, the parsing module 1002 includes a parsing submodule 1301 and an acquisition submodule 1302;

The parsing submodule 1301 is configured to parse a DMRS sequence of a PBCH in the SSB and data bits in the PBCH according to the synchronization broadcast transmission.

The acquisition submodule 1302 is configured for acquiring the SSB identifier through both the DMRS sequence of the PBCH in the SSB and the data bits in the PBCH.

Figure 10B:
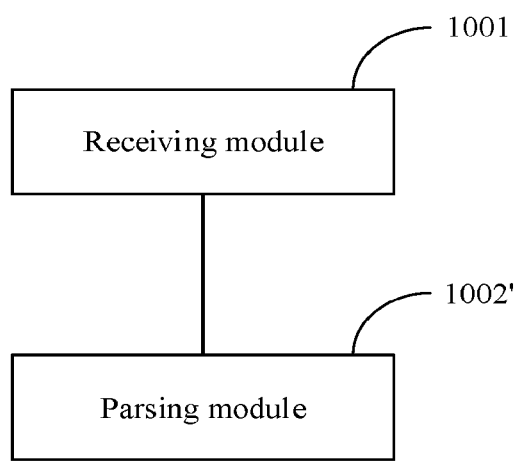
FIG. 10B is a block diagram of a device for transmitting a synchronization broadcast transmission according to another exemplary embodiment.

FIG. 10B is a block diagram of a device for transmitting a synchronization broadcast transmission according to another exemplary embodiment. The device may be implemented as a part or whole of an electronic device through software, hardware or a combination of the two. Referring to FIG. 10B, the device for transmitting a synchronization broadcast transmission includes a receiving module 1001, and a parsing module 1002'.

The receiving module 1001 is configured to receive synchronization broadcast transmission from a base station.

The parsing module 1002' is configured to parse an SSB according to the synchronization broadcast transmission, for acquiring an SSB identifier. Specifically, in paring the SSB according to the synchronization broadcast transmission, for acquiring the SSB identifier, the parsing module 1002' is configured to derive the SSB identifier according to a correspondence relationship between a number of at least one candidate transmission location and a number of SSBs in one time interval, wherein one of the at least one candidate transmission location is corresponding to the SSB, and the number of the at least one candidate transmission location is greater than the number of SSBs in the one time interval.

In an embodiment, in deriving the SSB identifier, the parsing module 1002' is specifically configured to parse a demodulation reference signal (DMRS) sequence of a physical broadcast channel (PBCH) in the SSB and data bits in the PBCH according to the synchronization broadcast transmission, and acquire the SSB identifier through the DMRS sequence of the PBCH in the SSB and the data bits in the PBCH.

With respect to the device in the above embodiment, the specific manners for performing operations for individual modules therein have been described in detail in the embodiment regarding the method, which will not be elaborated herein.

Figure 14:
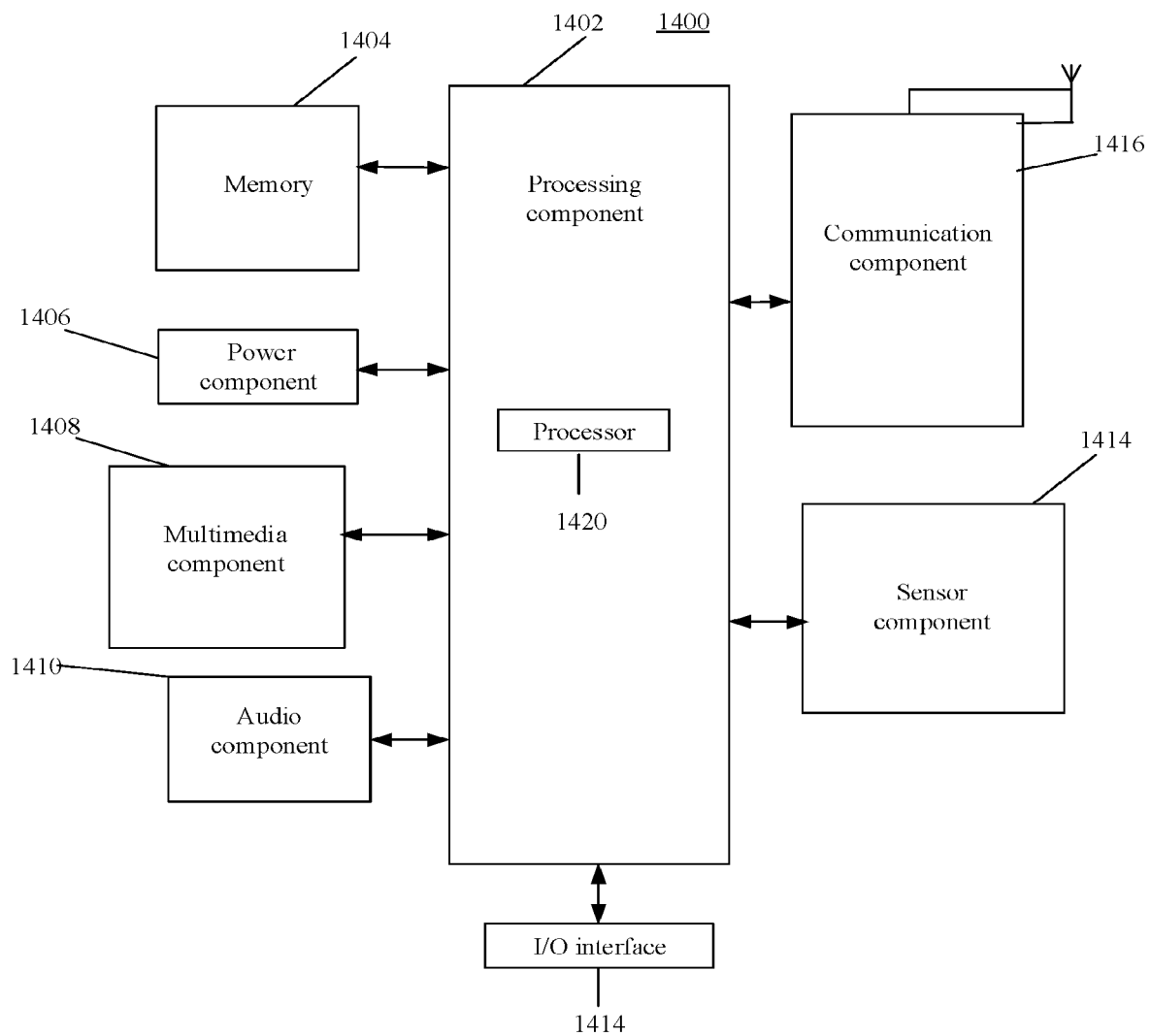
FIG. 14 is a block diagram of a device adapted for transmission of synchronization broadcast transmission according to an exemplary embodiment.

FIG. 14 is a block diagram of a device for transmitting synchronization broadcast transmission according to an exemplary embodiment. For example, the device 1400 may be a mobile phone, a computer, a digital broadcast terminal, a messaging device, a gaming console, a tablet, a medical device, exercise equipment, a personal digital assistant and the like.

The device 1400 may include one or more of the following components: a processing component 1402, a memory 1404, a power component 1406, a multimedia component 1408, an audio component 1410, an Input/Output (I/O) interface 1414, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the abovementioned method. Moreover, the processing component 1402 may include one or more modules which facilitate interaction between the processing component 1402 and the other components. For instance, the processing component 1402 may include a multimedia module to facilitate interaction between the multimedia component 1408 and the processing component 1402.

The memory 1404 is configured to store various types of data to support the operation of the device 1400. Examples of such data include instructions for any applications or methods operated on the device 1400, contact data, phonebook data, messages, pictures, video, etc. The memory 1404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1406 provides power for various components of the device 1400. The power component 1406 may include a power management system, one or more power supplies, and other components associated with generation, management and distribution of power for the device 1400.

The multimedia component 1408 includes a screen providing an output interface between the device 1400 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1408 includes a front camera and/or a rear camera. The front camera and/or the rear camera may receive external multimedia data when the device 1400 is in an operation mode, such as a photographing mode or a video mode. Each of the front camera and the rear camera may be a fixed optical lens system or have focusing and optical zooming capabilities.

The audio component 1410 is configured to output and/or input an audio signal. For example, the audio component 1410 includes a Microphone (MIC), and the MIC is configured to receive an external audio signal when the device 1400 is in the operation mode, such as a call mode, a recording mode and a voice recognition mode. The received audio signal may further be stored in the memory 1404 or transmitted through the communication component 1416. In some embodiments, the audio component 1410 further includes a speaker configured to output the audio signal.

The I/O interface 1414 provides an interface between the processing component 1402 and a peripheral interface module, and the peripheral interface module may be a keyboard, a click wheel, a button and the like. The button may include, but not limited to: a home button, a volume button, a starting button and a locking button.

The sensor component 1414 includes one or more sensors configured to provide status assessment in various aspects for the device 1400. For instance, the sensor component 1414 may detect an on/off status of the device 1400 and relative locationing of components, such as a display and small keyboard of the device 1400, and the sensor component 1414 may further detect a change in a location of the device 1400 or a component of the device 1400, presence or absence of contact between the user and the device 1400, orientation or acceleration/deceleration of the device 1400 and a change in temperature of the device 1400. The sensor component 1414 may include a proximity sensor configured to detect presence of an object nearby without any physical contact. The sensor component 1414 may also include a light sensor, such as a Complementary Metal Oxide Semiconductor (CMOS) or Charge Coupled Device (CCD) image sensor, configured for use in an imaging application. In some embodiments, the sensor component 1414 may also include an acceleration sensor, a gyroscope sensor, a magnetic sensor, a pressure sensor or a temperature sensor.

The communication component 1416 is configured to facilitate wired or wireless communication between the device 1400 and another device. The device 1400 may access any communication-standard-based wireless network, such as a Wi-Fi network, a 2nd-Generation (2G) or 3rd-Generation (3G) network or a combination thereof. In an exemplary embodiment, the communication component 1416 receives a broadcast signal or broadcast associated information from an external broadcast management system through a broadcast channel. In an exemplary embodiment, the communication component 1416 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1404 including an instruction, and the instruction may be executed by the processor 1420 of the device 1400 to implement the above-mentioned method. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

In an exemplary embodiment, a device for transmitting a synchronization broadcast transmission is provided. The device can include a processor and a memory configured to store an instruction executable for a processor. The processor can be configured to receive synchronization broadcast transmission from a base station, parse an SSB according to the synchronization broadcast transmission, for acquiring an SSB identifier, and determine a subframe number corresponding to the acquired SSB identifier according to a preset correspondence relationship between SSB identifiers and subframe numbers.

The processor may further be configured such that a maximum value of the at least one SSB identifier corresponds to the number of at least one candidate transmission location. The method can further include converting the acquired SSB identifier according to a correspondence relationship between the number of the at least one candidate transmission location and the number of SSBs in one time interval. Additionally, the operation of determining the subframe number corresponding to the acquired SSB identifier can include determining a subframe number corresponding to the converted SSB identifier.

The processor may further be configured to, in parsing the SSB according to the synchronization broadcast transmission, for acquiring the SSB identifier, parse a DMRS sequence of a PBCH in the SSB and data bits in the PBCH according to the synchronization broadcast transmission, and acquire the SSB identifier through both the DMRS sequence of the PBCH in the SSB and the data bits in the PBCH.

A non-transitory computer-readable storage medium is provided. Instructions in the storage medium, when executed by the processor of the device, enables the device to execute the method for transmitting a synchronization broadcast transmission. The method can include receiving synchronization broadcast transmission from a base station, parsing an SSB according to the synchronization broadcast transmission, for acquiring an SSB identifier, and determining a subframe number corresponding to the acquired SSB identifier according to a preset correspondence relationship between SSB identifiers and subframe numbers.

The instructions in the storage medium may further include that a maximum value of the at least one SSB identifier corresponds to the number of at least one candidate transmission location. The method can further include converting the acquired SSB identifier according to a correspondence relationship between the number of the at least one candidate transmission location and the number of SSBs in one time interval. Additionally, the operation of determining the subframe number corresponding to the acquired SSB identifier can include determining a subframe number corresponding to the converted SSB identifier.

The instructions in the storage medium may further include that the operation of parsing the SSB according to the synchronization broadcast transmission and the SSB identifier includes parsing a DMRS sequence of a PBCH in the SSB and data bits in the PBCH according to the synchronization broadcast transmission, and acquiring the SSB identifier through both the DMRS sequence of the PBCH in the SSB and the data bits in the PBCH.

Figure 15:
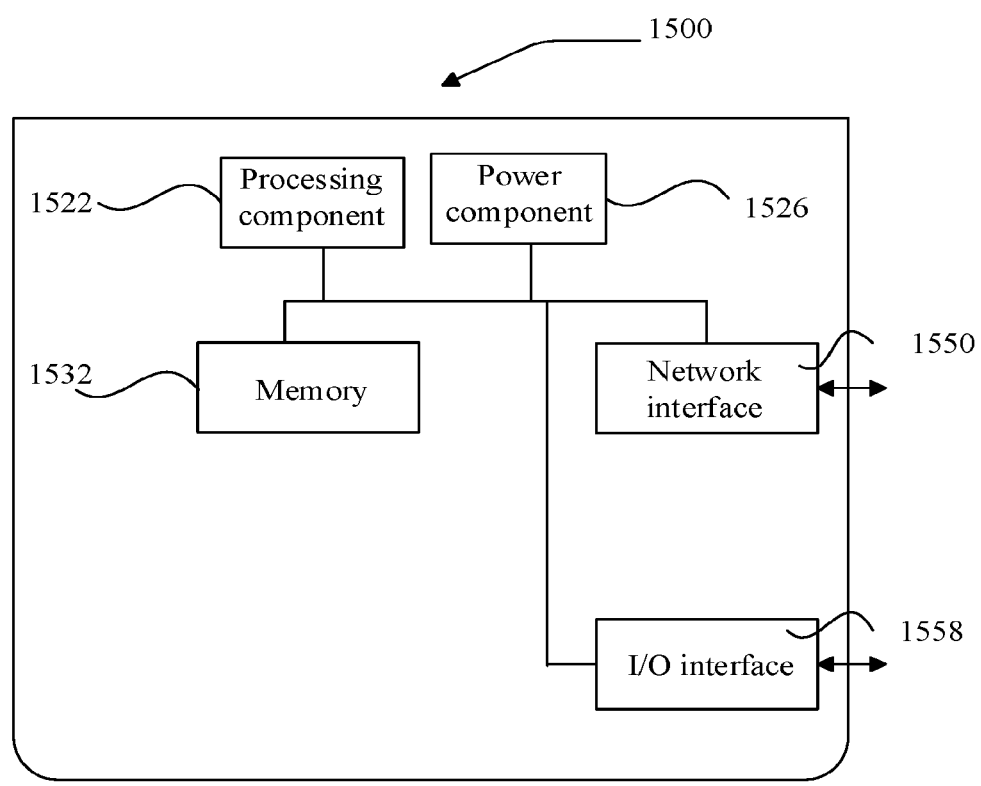
FIG. 15 is a block diagram of a device adapted for transmission of synchronization broadcast transmission according to an exemplary embodiment.

FIG. 15 is a block diagram of a device 1500 for data synchronization, according to an exemplary embodiment. For example, the device 1500 may be provided as a computer. Referring to FIG. 15, the device 1500 includes a processing component 1522, further including one or more processors, and a memory resource represented by a memory 1532, configured to store instructions executable for the processing component 1522, for example, an application program. The application program stored in the memory 1532 may include one or more than one module of which each corresponds to a set of instructions. In addition, the processing component 1522 is configured to execute the instructions to execute the data synchronization method.

The device 1500 may further include a power component 1526 configured to execute power management of the device 1500, a wired or wireless network interface 1550 configured to connect the device 1500 to a network and an I/O interface 1558. The device 1500 may be operated based on an operating system stored in the memory 1532, for example, Windows Server™, Mac OS X™, Unix™, Linux™, FreeBSD™, or the like.

In an exemplary embodiment, a device for transmitting a synchronization broadcast transmission is provided, which includes a processor and a memory configured to store an instruction executable for a processor. The processor is configured to determine at least one candidate transmission location corresponding to at least one SSB to be transmitted, wherein a number of the at least one candidate transmission location is greater than a number of SSBs in one time interval. Further, the processor can be configure to generate synchronization broadcast transmission including the at least one SS, and transmit the generated synchronization broadcast transmission at the at least one candidate transmission location in a beam sweeping manner.

The processor may further be configured such that the number of the at least one candidate transmission location is n times the number of SSBs in one time interval, n is equal to 2 or n is a ratio of a duration of a time interval to a duration of a half frame.

The processor may further be configured such that the synchronization broadcast transmission further includes at least one SSB identifier of the at least one SSB; the at least one SSB identifier is carried in the at least one SSB, and a maximum value of the at least one SSB identifier corresponds to the number of SSBs in one time interval, or, the maximum value of the at least one SSB identifier corresponds to the number of the at least one candidate transmission location.

The processor may further be configured to transmit the at least one SSB identifier through both a DMRS sequence of a PBCH in the SSB and data bits in the PBCH.

The processor may further be configured to, in transmitting the generated synchronization broadcast transmission at the at least one candidate transmission location in the beam sweeping manner can include transmitting the generated synchronization broadcast transmission at the at least one candidate transmission location in a selected candidate transmitting slot in the beam sweeping manner. Further, a candidate set of the candidate transmitting slot can be {10, 20, 40, 80, 160}ms, or, the candidate set of the candidate transmitting slot be {5, 10, 20, 40, 80, 160}ms when the number of SSBs in one time interval is 4 and the candidate set of the candidate transmitting slot being {10, 20, 40, 80, 160}ms when the number of SSBs in one time interval is greater than 4.

The processor may further be configured such that at least two SSBs to be transmitted belong to a group. The method further includes detecting whether the at least one candidate transmission location is idle or not. When the at least one candidate transmission location is not idle, determining all SSBs in a group to which the at least one SSB to be transmitted belongs, and waiving transmission of the generated synchronization broadcast transmission at the at least one candidate transmission location corresponding to all the SSBs in the group in the beam sweeping manner.

A non-transitory computer-readable storage medium is provided. Instructions in the storage medium, when executed by the processor of the device, enable the device to execute the method for transmitting a synchronization broadcast transmission. The method including determining at least one candidate transmission location corresponding to at least one SSB to be transmitted, wherein a number of the at least one candidate transmission location is greater than a number of SSBs in one time interval. The method can also include generating synchronization broadcast transmission including the at least one SSB, and transmitting the generated synchronization broadcast transmission at the at least one candidate transmission location in a beam sweeping manner.

The instructions in the storage medium may further include that the number of the at least one candidate transmission location is n times the number of SSBs in one time interval, n is equal to 2 or n is a ratio of a duration of a time interval to a duration of a half frame.

The instructions in the storage medium may further include that the synchronization broadcast transmission further includes at least one SSB identifier of the at least one SSB; the at least one SSB identifier is carried in the at least one SSB, and a maximum value of the at least one SSB identifier corresponds to the number of SSBs in one time interval, or, the maximum value of the at least one SSB identifier corresponds to the number of the at least one candidate transmission location.

The instructions in the storage medium may further include that the at least one SSB identifier is transmitted through both a DMRS sequence of a PBCH in the SSB and data bits in the PBCH.

The instructions in the storage medium may further include that the operation of transmitting the generated synchronization broadcast transmission at the at least one candidate transmission location in the beam sweeping manner includes transmitting the generated synchronization broadcast transmission at the at least one candidate transmission location in a selected candidate transmitting slot in the beam sweeping manner. A candidate set of the candidate transmitting slot is {10, 20, 40, 80, 160}ms, or, the candidate set of the candidate transmitting slot is {5, 10, 20, 40, 80, 160}ms when the number of SSBs in one time interval is 4 and the candidate set of the candidate transmitting slot being {10, 20, 40, 80, 160}ms when the number of SSBs in one time interval is greater than 4.

The instructions in the storage medium may further include that at least two SSBs to be transmitted belong to a group. The method can further include detecting whether the at least one candidate transmission location is idle or not. When the at least one candidate transmission location is not idle, determining all SSBs in a group to which the at least one SSB to be transmitted belongs, and waiving transmission of the generated synchronization broadcast transmission at the at least one candidate transmission location corresponding to all the SSBs in the group in the beam sweeping manner.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for receiving a synchronization broadcast transmission, applied in an unlicensed frequency band, comprising:
performing, by a user equipment (UE), a search at a plurality of candidate transmission locations to receive at least one synchronization broadcast transmission from a base station at part of the plurality of candidate transmission locations, wherein each of the at least one synchronization broadcast transmission comprises a respective one of at least one synchronization signal/physical broadcast channel block (SSB), and a number of the plurality of candidate transmission locations is greater than a pre-configured maximum number of SSBs transmittable by the base station in one time interval; and
acquiring, by the UE, at least one SSB identifier of the at least one SSB from the at least one synchronization broadcast transmission, wherein the at least one SSB identifier is carried in the at least one SSB,
wherein a maximum value of the at least one SSB identifier corresponds to the pre-configured maximum number of SSBs transmittable by the base station in one time interval, or the maximum value of the at least one SSB identifier corresponds to the number of the plurality of candidate transmission locations.

2. The method of claim 1, wherein the number of the plurality of candidate transmission locations is n times the pre-configured maximum number of SSBs transmittable by the base station in one time interval, where n is equal to 2, or n is a ratio of a duration of one time interval to a duration of a half frame.

3. The method of claim 1, wherein acquiring the at least one SSB identifier comprises:
parsing a demodulation reference signal (DMRS) sequence of a physical broadcast channel (PBCH) in each of the at least one SSB and data bits in the PBCH according to a respective synchronization broadcast transmission of the at least one synchronization broadcast transmission; and
acquiring an SSB identifier of each of the at least one SSB through both the DMRS sequence of the PBCH in the each of the at least one SSB and the data bits in the PBCH.

4. The method of claim 1, wherein one or more of the plurality of candidate transmission locations is in a candidate transmitting slot of a set of candidate transmitting slots; and
wherein the set of candidate transmitting slots is {10, 20, 40, 80, 160}ms, or,
the set of candidate transmitting slots is {5, 10, 20, 40, 80, 160}ms in response to the pre-configured maximum number of SSBs transmittable by the base station in one time interval being 4, or the set of candidate transmitting slots is {10, 20, 40, 80, 160}ms in response to the pre-configured maximum number of SSBs transmittable by the base station in one time interval being greater than 4.

5. A device for receiving a synchronization broadcast transmission, comprising:
a processor; and
a memory configured to store instructions executable by the processor,
wherein the processor is configured to:
perform a search at a plurality of candidate transmission locations to receive at least one synchronization broadcast transmission from a base station at part of the plurality of candidate transmission locations, wherein each of the at least one synchronization broadcast transmission comprises a respective one of at least one synchronization signal/physical broadcast channel block (SSB), and a number of the plurality of candidate transmission locations is greater than a pre-configured maximum number of SSBs transmittable by the base station in one time interval; and
acquire at least one SSB identifier of the at least one SSB from the at least one synchronization broadcast transmission, wherein the at least one SSB identifier is carried in the at least one SSB,
wherein a maximum value of the at least one SSB identifier corresponds to the pre-configured maximum number of SSBs transmittable by the base station in one time interval, or the maximum value of the at least one SSB identifier corresponds to the number of the plurality of candidate transmission locations.

6. The device of claim 5, wherein the number of the plurality of candidate transmission locations is n times the pre-configured maximum number of SSBs transmittable by the base station in one time interval, where n is equal to 2, or n is a ratio of a duration of one time interval to a duration of a half frame.

7. The device of claim 5, wherein the processor is specifically configured to:
parse a demodulation reference signal (DMRS) sequence of a physical broadcast channel (PBCH) in each of the at least one SSB and data bits in the PBCH according to a respective synchronization broadcast transmission of the at least one synchronization broadcast transmission; and
acquire an SSB identifier of each of the at least one SSB through both the DMRS sequence of the PBCH in the each of the at least one SSB and the data bits in the PBCH.

8. The device of claim 5, wherein one or more of the plurality of candidate transmission locations is in a candidate transmitting slot of a set of candidate transmitting slots; and
wherein the set of candidate transmitting slots is {10, 20, 40, 80, 160}ms, or,
the set of candidate transmitting slots is {5, 10, 20, 40, 80, 160}ms in response to the pre-configured maximum number of SSBs transmittable by the base station in one time interval being 4, or the set of candidate transmitting slots is {10, 20, 40, 80, 160}ms in response to the pre-configured maximum number of SSBs transmittable by the base station in one time interval being greater than 4.

9. A non-transitory computer-readable storage medium, in which computer instructions are stored, wherein the instructions are executed by a processor to implement following actions:
performing a search at a plurality of candidate transmission locations to receive at least one synchronization broadcast transmission from a base station at part of the plurality of candidate transmission locations, wherein each of the at least one synchronization broadcast transmission comprises a respective one of at least one synchronization signal/physical broadcast channel block (SSB), and a number of the plurality of candidate transmission locations is greater than a pre-configured maximum number of SSBs transmittable by the base station in one time interval; and acquiring at least one SSB identifier of the at least one SSB from the at least one synchronization broadcast transmission, wherein the at least one SSB identifier is carried in the at least one SSB;

wherein a maximum value of the at least one SSB identifier corresponds to the pre-configured maximum number of SSBs transmittable by the base station in one time interval, or the maximum value of the at least one SSB identifier corresponds to the number of the plurality of candidate transmission locations.

10. The non-transitory computer-readable storage medium of claim 9, wherein the number of the plurality of candidate transmission locations is n times the pre-configured maximum number of SSBs transmittable by the base station in one time interval, where n is equal to 2, or n is a ratio of a duration of the time interval to a duration of a half frame.

11. The non-transitory computer-readable storage medium of claim 9, wherein acquiring the at least one SSB identifier comprises:

parsing a demodulation reference signal (DMRS) sequence of a physical broadcast channel (PBCH) in each of the at least one SSB and data bits in the PBCH according to a respective synchronization broadcast transmission of the at least one synchronization broadcast transmission; and acquiring an SSB identifier of each of the at least one SSB through both the DMRS sequence of the PBCH in the each of the at least one SSB and the data bits in the PBCH.

12. The non-transitory computer-readable storage medium of claim 9, wherein one or more of the plurality of candidate transmission locations is in a candidate transmitting slot of a set of candidate transmitting slots; and wherein the set of candidate transmitting slots is {10, 20, 40, 80, 160}ms, or, the set of candidate transmitting slots is {5, 10, 20, 40, 80, 160}ms in response to the pre-configured maximum number of SSBs transmittable by the base station in one time interval being 4, or the set of candidate transmitting slots is {10, 20, 40, 80, 160}ms in response to the pre-configured maximum number of SSBs transmittable by the base station in one time interval being greater than 4.

* * * * *